US005520214A

United States Patent [19]
Mack et al.

[11] Patent Number: 5,520,214
[45] Date of Patent: May 28, 1996

[54] REGULATOR AND FILL VALVE

[75] Inventors: Brian A. Mack, Lorain; Ronald J. Johnston, Wellington; Joe P. Quest, North Ridgeville, all of Ohio

[73] Assignee: Western/Scott Fetzer Company, Westlake, Ohio

[21] Appl. No.: 304,378

[22] Filed: Sep. 12, 1994

[51] Int. Cl.$^6$ ........................................ F16K 1/30
[52] U.S. Cl. ........................ 137/505.34; 137/505.35
[58] Field of Search .................. 137/505.33, 505.34, 137/505.35

[56] References Cited

U.S. PATENT DOCUMENTS

| | | | |
|---|---|---|---|
| 1,706,230 | 3/1929 | Hilger | 137/505.35 X |
| 2,041,198 | 5/1936 | McLean . | |
| 2,447,067 | 8/1948 | Hamilton . | |
| 2,768,643 | 10/1956 | Acomb . | |
| 3,348,573 | 10/1967 | Bradford . | |
| 3,400,735 | 9/1968 | Favors et al. . | |
| 3,605,800 | 9/1971 | Satoh . | |
| 3,693,652 | 9/1972 | Iung | 137/505.34 X |
| 3,749,356 | 7/1973 | Conley . | |
| 3,791,412 | 2/1974 | Mays . | |
| 3,911,947 | 10/1975 | Boxall . | |
| 3,926,208 | 12/1975 | Hoffman et al. . | |
| 3,995,656 | 12/1976 | Mills, Jr. . | |
| 4,033,378 | 7/1977 | Pauliukonis . | |
| 4,075,294 | 2/1978 | Saito et al. . | |
| 4,458,718 | 7/1984 | Vick . | |
| 4,510,993 | 4/1985 | Luetzelschwab . | |
| 4,802,504 | 2/1989 | Politi . | |
| 4,887,638 | 12/1989 | Hellquist et al. . | |
| 4,898,205 | 2/1990 | Ross . | |
| 4,942,899 | 7/1990 | Vork et al. . | |
| 5,022,435 | 7/1991 | Jaw-Shiunn . | |
| 5,135,023 | 8/1992 | Ross . | |

FOREIGN PATENT DOCUMENTS

| | | | |
|---|---|---|---|
| 737927 | 6/1943 | Germany | 137/505.35 |
| 372401 | 5/1973 | U.S.S.R. | 137/505.34 |

*Primary Examiner*—John C. Fox
*Attorney, Agent, or Firm*—Watts, Hoffmann, Fisher & Heinke Co.

[57] ABSTRACT

A regulator and fill valve assembly for filling a fluid pressure tank and for regulating the flow of pressurized fluid from the tank includes a regulator portion having a valve body with a piston chamber. A pressure flow passageway extends from an inlet end to a first end of the piston chamber and an outlet port communicates with the piston chamber. A piston is movable in the piston chamber. A first spring at a second opposite end of the piston chamber urges the piston toward the first end of the piston chamber. A handle is provided for manually controlling the force of the first spring acting on the piston. A check valve assembly is located in the passageway and includes a seat, a valve member, a valve guide and a second spring biasing the valve member and guide towards the seat. The valve member is movable in a direction towards a closed position against the seat by fluid pressure in the passageway and the biasing force of the second spring. A valve check actuator is located between the piston and the valve check. Movement of the piston toward the first end of the chamber tends to move the valve member to an open position. The assembly also includes a fill valve portion having valve body member with a through passageway including another valve chamber open at one end. A restricted flow passage is at the other end of the valve chamber. An outlet opening is connected to the flow passage. The valve body member is connected to the valve body so that a pressure port in the valve body communicates with the open end of the valve chamber. A valving member is slidable in the valve chamber and has a nose that opens and closes the restricted flow passage. A head of the valving member is located in the open end of the valve chamber. Portions establish fluid flow through the fill valve when the restricted flow passage is open. A spring acts on the valving member to urge it toward an open position. Fluid pressure in the pressure port acts on the head and holds the valving member closed until the force of the fluid pressure is overcome by the spring force. The spring holds the valving member open to permit the tank to be evacuated and charged with pressurized fluid.

13 Claims, 5 Drawing Sheets

REGULATOR AND FILL VALVE

BACKGROUND OF THE INVENTION

1. Technical Field

The present invention relates generally to a system for regulating the flow of a pressurized gas from a tank and, in particular, to an improved fill valve and to an improved constant flow regulator.

2. Description of the Prior Art

Systems for providing a pressurized gas to a use location, such as supplemental oxygen delivery to a medical patient, are known. The known oxygen delivery systems typically include a gas pressurizable tank which stores the oxygen under relatively high pressure. A regulator is operably connected to the tank for controlling the rate of flow of the pressurized gas from the tank to the use location.

When such delivery system is used for providing oxygen for "at home" use, a physician or medical technician prescribes a flow rate at which the oxygen is to be supplied to the patient as a function of the patient's need. The patient sets the known regulator to the prescribed flow rate, but the actual flow rate may vary as a function of pressure within the tank. As the pressure in the tank decreases with use, the actual flow rate of oxygen from the tank can increase or decrease from the initial prescribed rate which was set by the patient. If the patient does not frequently monitor and adjust the actual flow rate, an insufficient oxygen supply could be delivered or excess oxygen could be delivered and wasted. These are both undesirable situations.

Fill valves are also operably connected with the gas pressure tank. The known fill valves typically are opened and closed manually during filling and evacuation. Evacuation of the tank is required for medical oxygen to assure that no contaminants are present in the tank prior to re-filling the tank with purified oxygen.

SUMMARY OF THE INVENTION

The present invention is directed to an oxygen delivery system having a flow regulator and a fill valve assembly. The regulator portion of the present invention provides a substantially constant flow of pressurized oxygen from an associated tank and which flow is independent of the pressure of the oxygen within the tank. The fill valve portion of the present invention permits the evacuation of the tank prior to refilling the tank.

In a preferred form of the present invention, the regulator and fill valve assembly is for filling a gas pressure tank and for regulating the flow of pressurized fluid from the tank. The regulator portion of the assembly has a valve body with a piston chamber. A pressure flow passageway extends from an inlet end to a first end of the piston chamber. An outlet port communicates with the piston chamber. A piston is movable in the piston chamber and a first spring at a second opposite end of the piston chamber urges the piston toward the first end of located the piston chamber. A handle is provided for manually controlling the force of the first spring acting on the piston. A check valve assembly is located in the passageway includes a seat, a valve member, a valve guide and a second spring biasing the valve member and guide towards the seat, the valve member is movable in a direction towards a closed position against the seat by fluid pressure in the passageway and the biasing force of the second spring. A valve check actuator is located between the piston and the valve check. Movement of the piston toward the first end of the chamber tends to move the valve member to an open position. The fill valve portion of the assembly has a valve body member with a through passageway including a valve chamber open at one end. A restricted flow passage is at the other end of the valve chamber and an outlet opening is connected to the flow passage. The valve body member is connected to the valve body so that a pressure port in the valve body communicates with the open end of the valve chamber. A valving member is slidable in the valve chamber and has a nose that opens and closes the restricted flow passage. A head of the valving member is located in the open end of the valve chamber. Portions establish gas flow through the fill valve when the restricted flow passage is open. A spring acts on the valving member to urge it toward an open position. Fluid pressure in the pressure port acts on the head and holds the valving member closed until the force of the fluid pressure is overcome by the spring force. The spring holds the valving member open to permit the tank to be evacuated.

The regulator portion of assembly enables the substantially constant flow which is defined as a change in flow rate of less than five percent for a pressure decrease in the tank from 2200 psi to 200 psi. The regulator portion's control handle is rotatably movable relative to the valve body and has an end portion that is linearly movable within the piston chamber upon rotation of the control handle relative to the valve body. The control handle and first spring positions the piston in the piston chamber and thereby opens the check valve assembly to a desired flow rate. The force of pressure in the piston chamber on one side of the piston acts against the force of the first spring to establish an initial position. A change in pressure in the piston chamber changes the position of the piston and, thus, the flow to keep the flow as constant as possible.

The valve member has an exterior surface in a spherical shape and the seat is annular and elastomeric for positive sealing. The pressure flow passage and the piston chamber are located coaxially relative to one another. The fill valve portion includes a stop to limit movement of the fill valve member in a direction away from the restricted flow passage.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
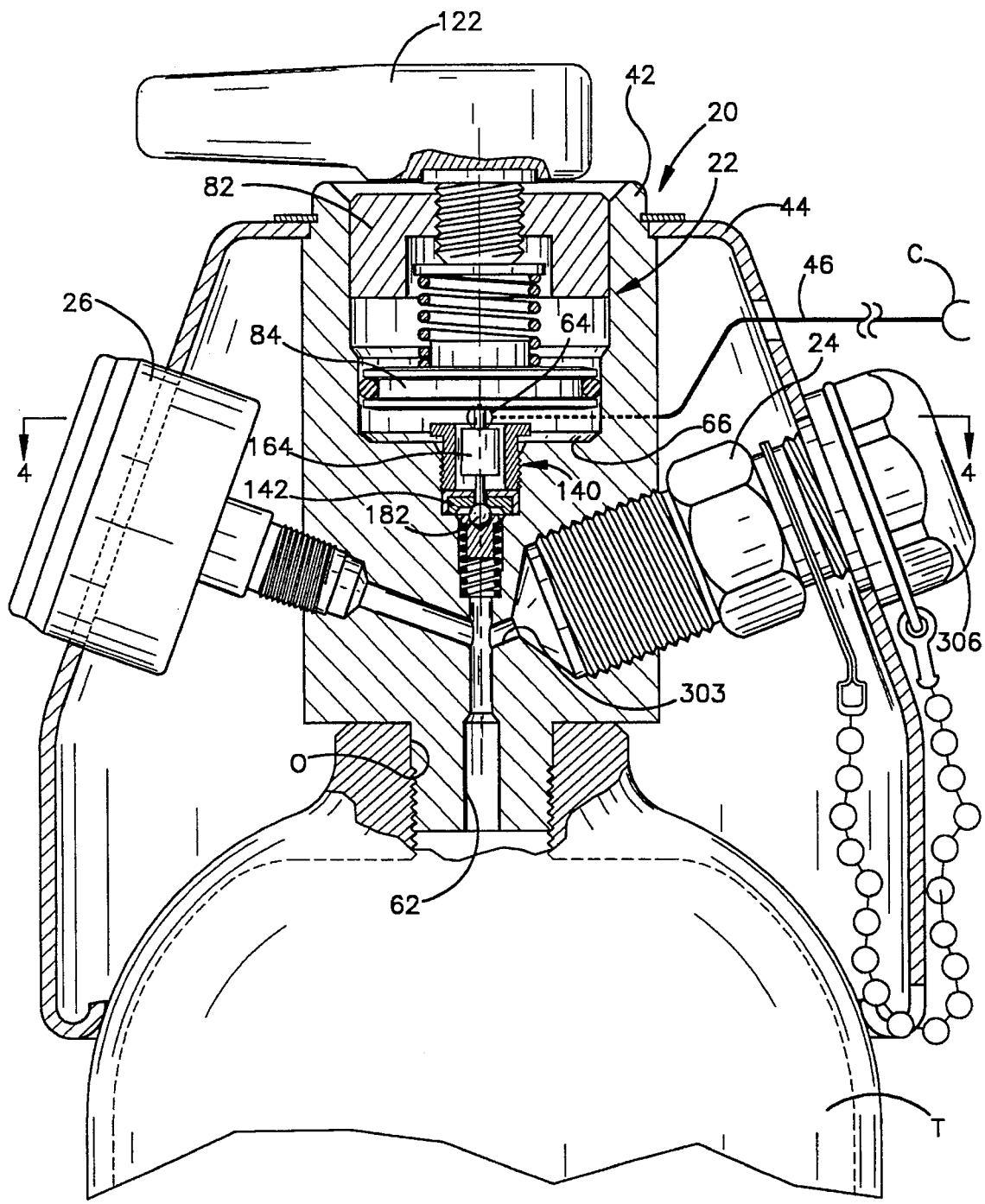
FIG. 1 is a front elevational view, partly in section, of a regulator and fill valve assembly embodying the present invention connected to a pressure tank.

A regulator and fill valve assembly 20 is illustrated in FIG. 1 for use on a fluid pressure tank T and is provided for supplying a gas, such as supplemental oxygen, to a use location, such as a medical patient. The assembly 20 includes a regulator 22, a fill valve 24 and a conventional pressure gauge and relief valve assembly 26. A valve body 42 of the assembly 20 is threaded into an opening O of the tank T. As shown, the assembly 20 also includes a cover 44 around the valve body 42.

Figure 2:
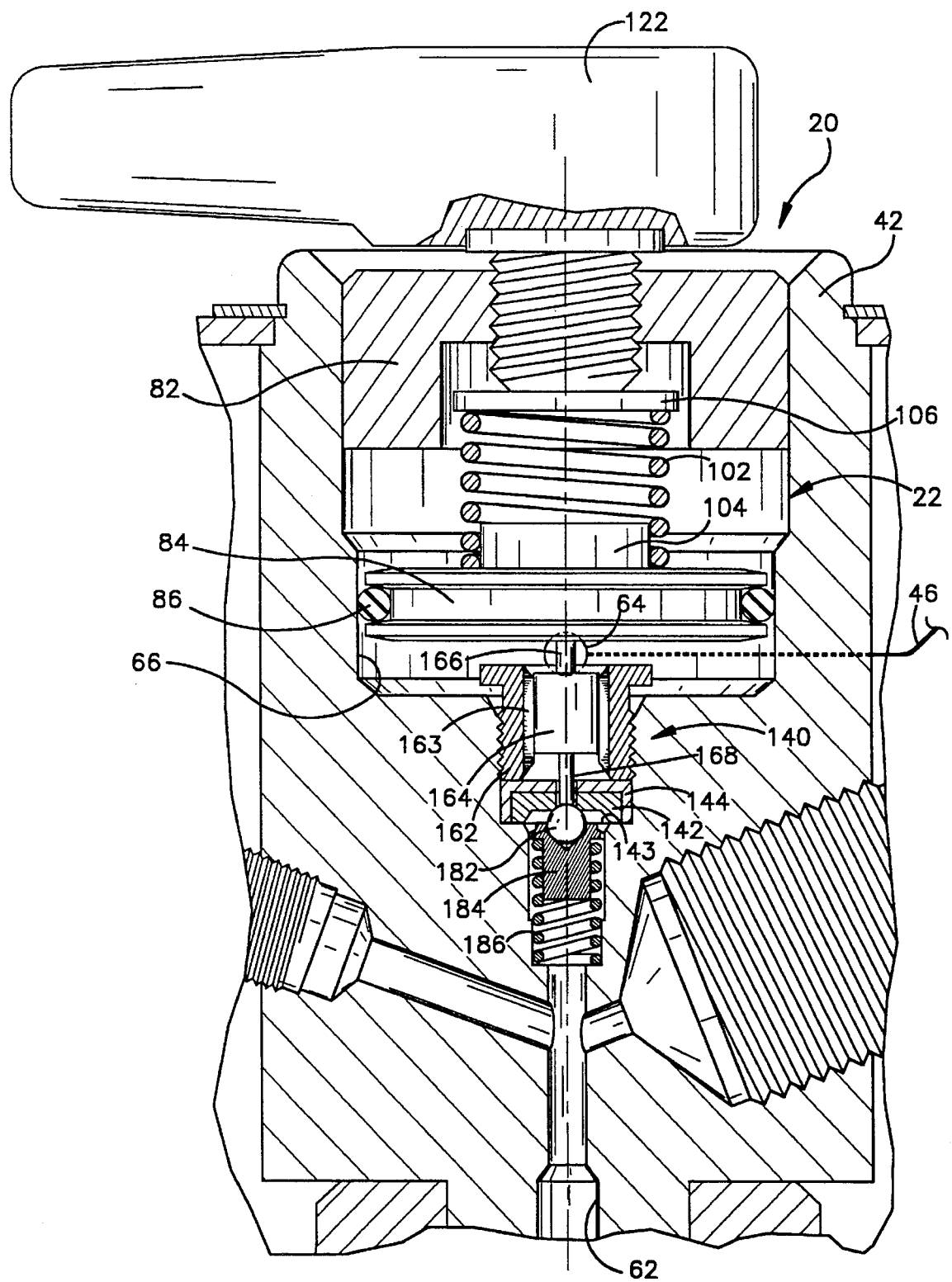
FIG. 2 is an enlarged cross-sectional view of the regulator of FIG. 1.
Figure 3:
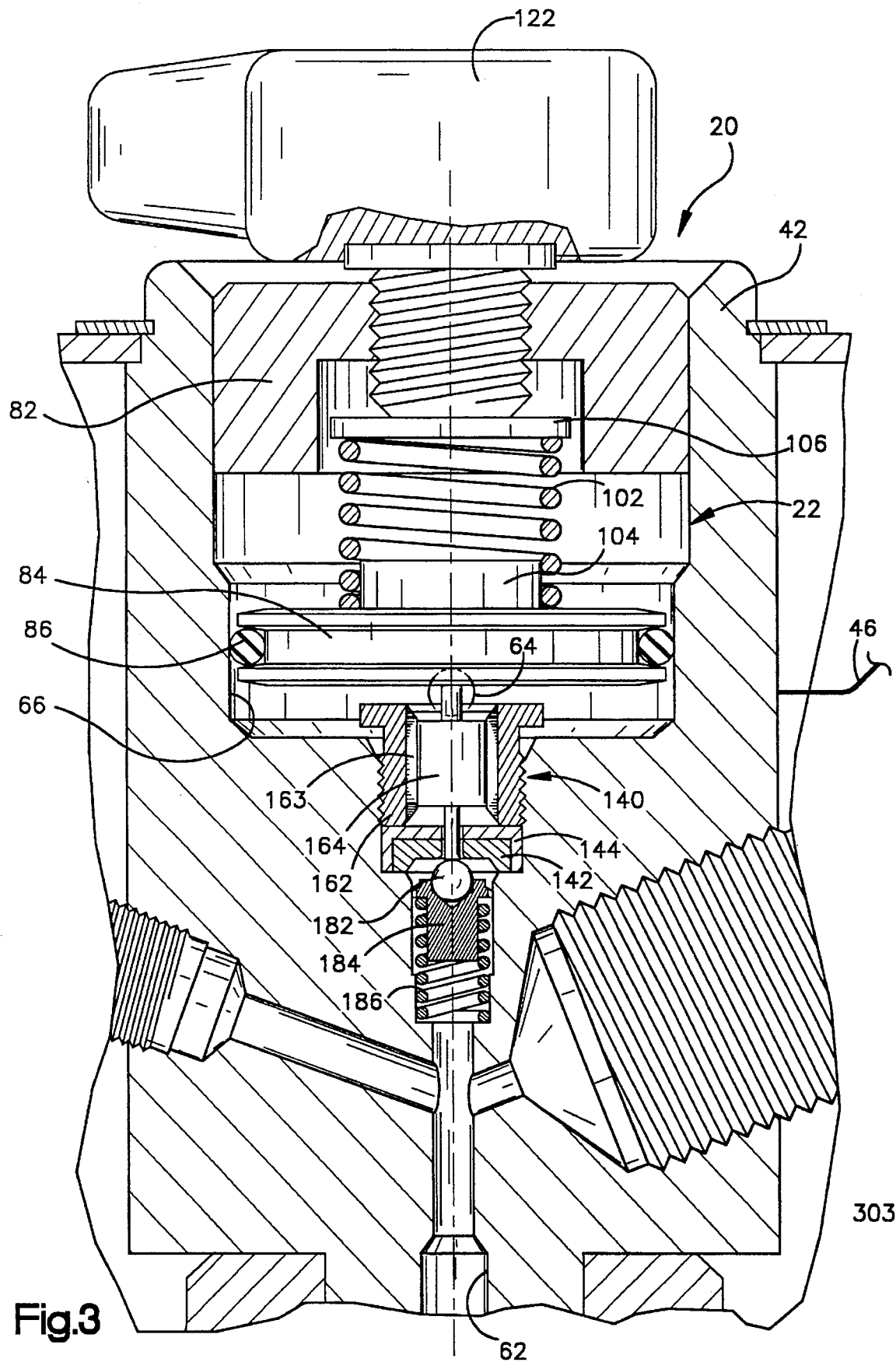
FIG. 3 is a view similar to FIG. 2 with parts in different positions.

The regulator 22 is constructed to provide a substantially constant rate of flow of oxygen to a patient at the use location, such as a cannula C. The constant flow rate is provided by the regulator 22 independent of pressure within the tank T. The regulator 22 has a passage 62 formed in the valve body 42 extending longitudinally from the end that is threaded into the tank T to a piston chamber 66. The valve body 42 also has a lateral outlet port 64 (FIGS. 2 and 3) which opens into the bottom of the piston chamber 66 and is adapted to be suitably connected to the use location C, as by a barb 45 and hose 46.

The piston chamber 66 is closed by a cap 82. A piston 84 (FIGS. 2 and 3) is located within the piston chamber 66 for reciprocal movement and carries a seal ring 86 that rolls against the side of the piston chamber during reciprocal movement of the piston in the piston chamber. A spring 102 is placed around a locating portion 104 of the piston 84 to bias the piston downwardly relative to the piston chamber 66, and provide a preload force that acts against pressure in the chamber below the piston. A washer 106 is located at an axially opposite end of the spring 102 away from the piston 84. A control handle 122 is threaded into the cap 82. An end portion of the control handle 122 located within the upper part of the chamber 66 engages the washer 106 to move the spring 102 and piston 84 downwardly or to compress the spring, depending on the pressure in the chamber below the piston. The control handle 122 establishes a desired location of the piston 84 within the chamber 66 as a function of the relative rotational position of the handle relative to the body 42.

The regulator 22 also includes a flow check valve assembly 140. The flow check valve assembly 140 includes an annular elastomeric seat 142 located coaxially in a retainer 144 within the passage 62. A sleeve 162 is threaded into the end of the passageway 62 to hold the retainer 144 and seat 142 against a shoulder 143. The sleeve 162 has longitudinal ribs 163 circumferentially arrayed on its inner surface that define flow passages. An actuator 164 is located within the sleeve 162 for engagement with the ribs 163 and for reciprocal movement in response to movement of the piston 84 within the chamber 66. The actuator 164 has an upper extension 166 for engaging the bottom of the piston 84 and a lower extension 168.

A spherical ball valve member 182 is located within the passage 62 below the seat 142. The ball valve member 182 is carried in a positioning guide 184. The guide 184 and ball valve member 182 are biased in a direction towards a closed position against the seat 142 by a spring 186 to block flow through the passage 66 when the ball valve member engages the seat. The spring rate of the spring 186 is relatively lower than the spring rate of the spring 102 located in the piston chamber 66.

Figure 4:
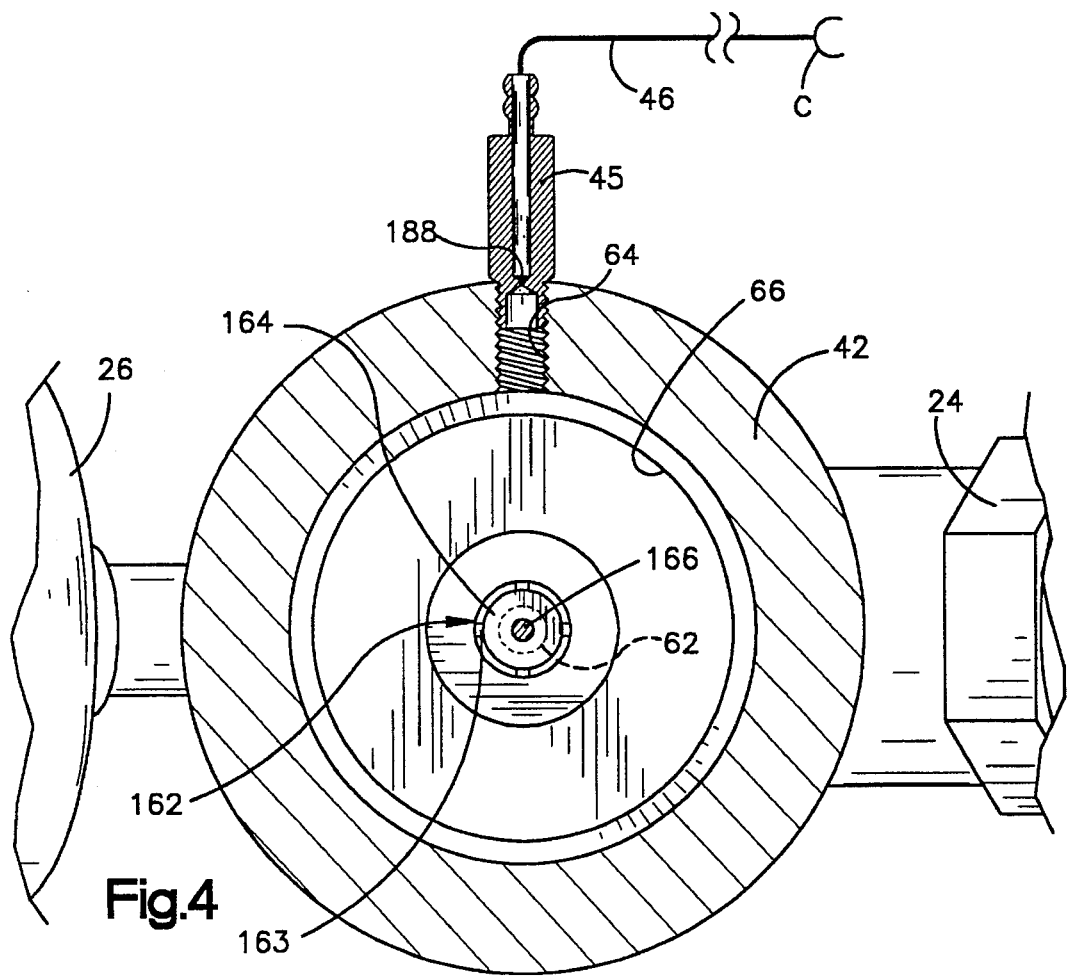
FIG. 4 is a cross-sectional taken approximately along line 4—4 in FIG. 1.

The size of an opening 188 in the barb 45 (FIG. 4), of the opening in the annular seat 142 (FIGS. 2 and 3), of the ball valve member 182 and of the piston 84 are important to providing the constant flow rate advantage of the regulator 22 of the present invention. For example, the opening 188 in the barb 45 is approximately a 0.020 inch diameter orifice. Fluid pressure is metered through the opening 188 as a function of the pressure in the piston chamber 66. Pressure in the piston chamber 66 is established by controlling the fluid communication with pressure in the tank T. A relationship between the diameter of the piston 84 to the flow area between the ball valve member 182 and seat 142 has been found to be important to providing a substantially constant flow of oxygen from the tank. Specifically, the larger the ratio of the diameter of the piston 84 to the flow area between the ball valve member 182 and the seat 142 the more constant the flow through the opening 188 in the barb 45.

The lower extension 168 of the actuator 164 transmits motion of the piston 84 to the ball valve member 182 to selectively move the ball valve member away from or towards the seat 142. The actuator 164 establishes the position of the ball valve member 182 relative to the seat 142 as a function of the position of the piston 84 within the chamber 66. As viewed in FIG. 2, the ball valve member 182 engages the seat 142 and blocks flow of the pressurized fluid through the passage 62 from the tank T to the outlet portion 64 when the piston 84 is at or above the relative position within the chamber 66 illustrated in FIG. 2. When the handle 122 is rotated from that relative position to the position illustrated in FIG. 3, the washer 106 moves downwardly to compress the spring 102 and force the piston 84 downwardly. When the piston 84 moves downwardly within the chamber 66 from the position illustrated in FIG. 2 to the position illustrated in FIG. 3, the ball valve member 182 is moved by the actuator 164 away from the seat 142 to an open position to allow fluid flow from the passage 62 into the chamber 66 below the piston 84 and out through the outlet port 64. The relative position of the piston 84 within the chamber 66 is established by the force of the spring 102 tending to move the piston downwardly and the pressure in the chamber below the piston tending to move it upwardly. Upward movement of the piston 84 in the chamber 66 allows the actuator 164 to move the ball valve member 182 towards the seal to reduce or block flow through the passage 62.

The handle 122 is turned to a position relative to the valve body 42 which is indicative of a desired or prescribed constant flow rate. For example, the cover 44 may include a series of indexed marks which can be used to determine an approximate flow rate of a pressurized oxygen from within the tank T to the outlet port 64. Such a flow rate may be in terms of liters per minute, for example a rate of four liters per minute. As the pressure within the tank T decreases from use, pressure in the lower part of the chamber 66 below the piston 84 decreases proportionately. Less force is exerted on the bottom of the piston 84 against the force of the spring 102 and the piston moves downwardly in the chamber 66 as a function of the pressure decreasing in the tank T. This downward movement of the piston 84 within the chamber 66 causes the actuator 164 to move downwardly an equivalent distance to move the ball valve member 182 in a direction away from the seat 142, as described above. The flow area between the ball valve member 182 and the seat 142 proportionately increases to increase the flow of oxygen from the tank T and increase the pressure in the chamber 66 below the piston 84 to a relatively constant pressure which establishes a relatively constant flow from the outlet port 64.

For example, if the handle 122 is turned to a flow rate of two liters per minute, pressure in the chamber 66 is in the range of eight to ten psi. If the handle 122 is turned to a flow rate of eight liters per minute, pressure in the chamber 66 is approximately fifty psi. The spring 102 attempts to keep this pressure within the chamber 66 below the piston 84 and seal 86 constant by allowing the piston to move downwardly when pressure in the chamber decreases. Movement of the piston 84 forces the actuator 164 downwardly and the ball valve member 182 away from the seat 142 to increase fluid communication with the tank T and pressure in the chamber 66. Increasing pressure in the chamber 66 forces the piston upwardly to reduce the flow area between the ball valve member 182 and seat 142 and the fluid communication with the tank T.

Figure 5:
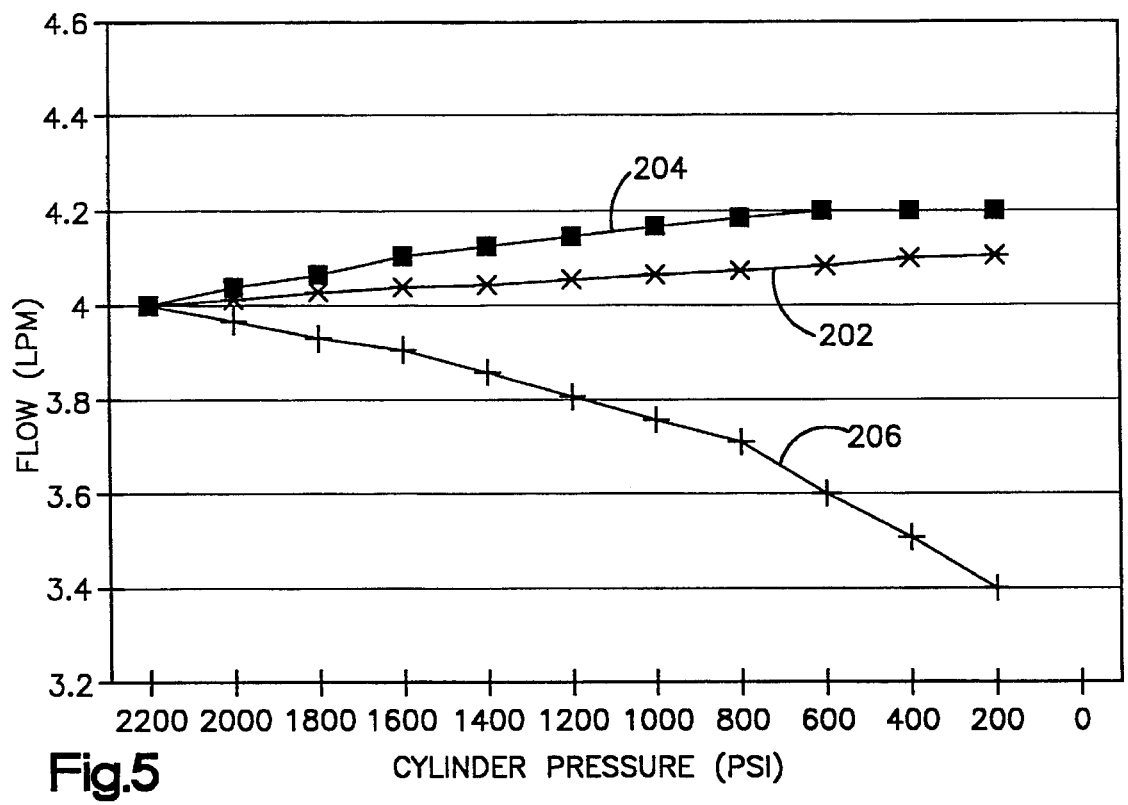
FIG. 5 is a graphical representation of flow rate related to pressure of the regulator of the present invention compared to two prior art regulators.

This constant rate of flow of oxygen from the outlet port 64 of the tank T is a desirable feature and is illustrated in FIG. 5. The line 202 indicates the results of testing of the regulator 22 embodying the present invention. It will be apparent that the flow rate increases slightly from approximately four liters per minute to approximately 4.1 liters per minute. This is a flow rate increase of less than five percent (5%), specifically 2.5%, over a pressure decrease 2200 psi to 200 psi. The line 204 represents the flow rate of a conventional regulator which increases slightly more in flow rate, to 4.2 liters per minute or five percent, as cylinder pressure within the tank decreases the same amount as line 202. The line 206 represents the flow rate of another conventional regulator which decreases to 3.4 liters per minute or 15% as a function of the same cylinder pressure decrease.

Figure 6:
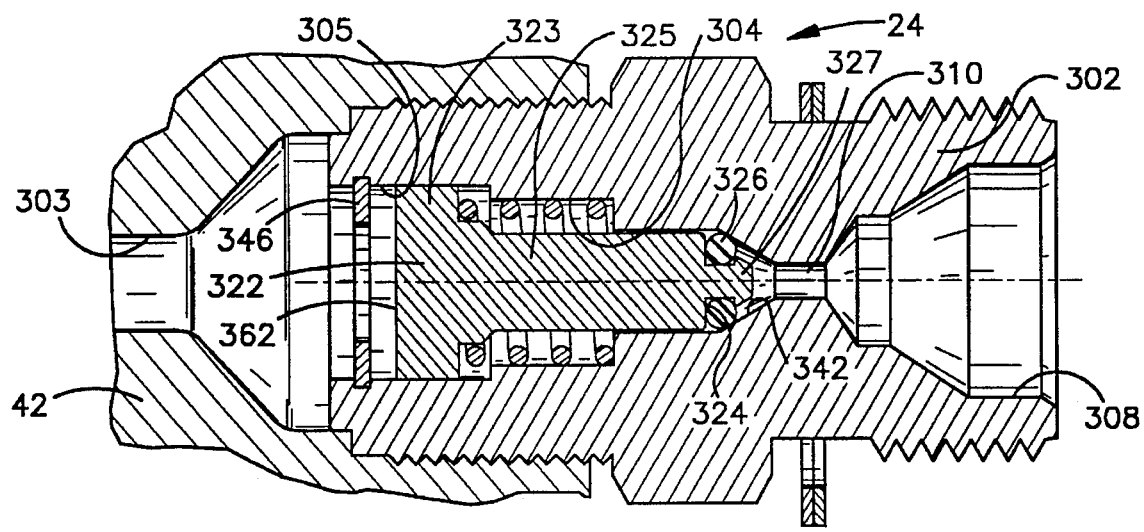
FIG. 6 is an enlarged cross-sectional view of the fill valve of FIG. 1.
Figure 7:
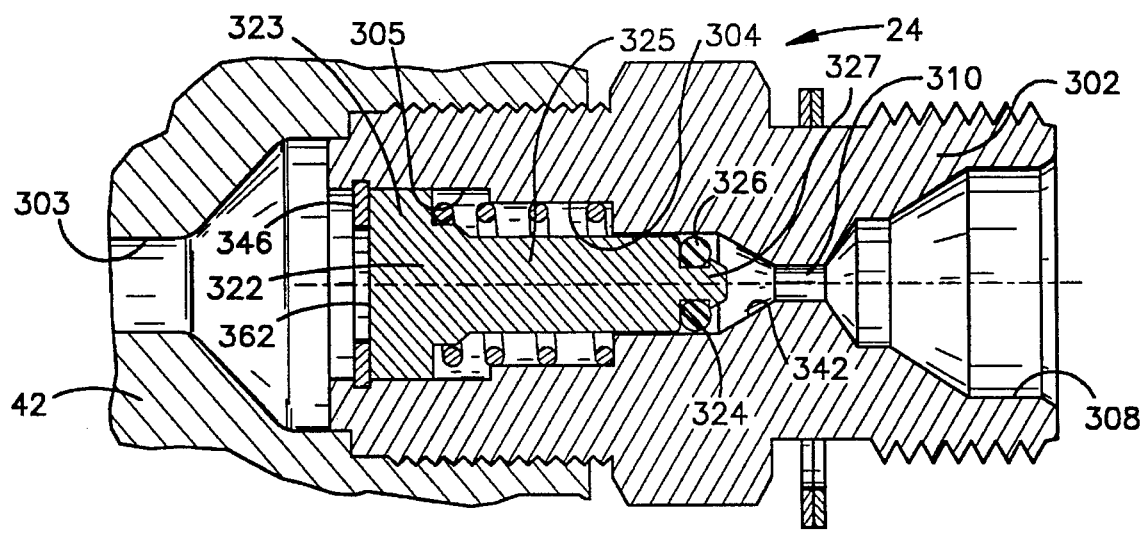
FIG. 7 is a view similar to FIG. 4 with parts in different positions.

The fill valve 24 of the present invention is illustrated in FIGS. 6 and 7. The fill valve 24 enables the tank T to be evacuated prior to re-filling to ensure that there are no contaminants within the tank T. The fill valve 24 includes a fill valve body 302 which is threaded into the regulator valve body 42, as illustrated in FIG. 1. A through passage 304 (FIGS. 6 and 7) extends longitudinally through the fill valve body 302 and is in fluid communication with a port 303 extending from the passage 62 in the regulator valve body 42, as viewed in FIG. 1. The passage 304 has a chamber 305 at one end and an inlet portion 308 at another end. A restricted portion 310 of the passage 304 is located between the chamber 305 and inlet portion 308. The fill valve assembly 24 includes a cap 306 (FIG. 1) which is received on the inlet portion 308 of the body 302. The cap 306 acts as a secondary seal to prevent the loss of pressurized fluid from within the tank T when the fill valve assembly 24 is not in use.

A valve member 322 is received in the chamber 305 of the passage 304. The valve member 322 has a head 323, a body portion 325 and a tapered nose 327. The valve member 322 has a groove 324 in the nose 327 near an axial end. A seal 326 is received in the groove 324. The valve member 322 is movable within the chamber 305 so the seal 326 engages a tapered seat portion 342 of the restricted portion 310 of the passage 304 to block the flow of fluid through the passage, as illustrated in FIG. 6. The valve member 322 is also movable to an open position, as illustrated in FIG. 7, in a direction away from the tapered seat portion 342 to permit fluid flow through the passage 304.

A spring 344 biases the valve member 322 to the open position. A retainer 346 in the form of an expandable clip is located at the end of the chamber 305 to limit the open movement of the valve member 322. When fluid pressure within the tank T or port 303 is greater than the pressure in the inlet portion 308 plus the force exerted by the spring 344, the fill valve member 322 moves to the closed position, as illustrated in FIG. 6, to block fluid flow through the passage 304.

To evacuate the tank T, a fitting and hose (not shown) is connected to the inlet portion 308 and a vacuum is pulled. The vacuum is a relatively low negative pressure that subjects the valve member 322 to a force tending close the valve member which is less than the force exerted by the spring 344 tending to open the valve member. As long as the closing force is lower than the opening force the fill valve member 322 will remain in the open position and the tank T can be evacuated. When the tank T is evacuated, oxygen under pressure is supplied to the inlet portion 308. When the tank T is filled to the desired pressure, for example 2200 psi, oxygen delivery pressure at the inlet portion 308 is discontinued. Pressure within the tank T acting on the end surface 362 of the fill valve member 322 forces the fill valve member to move to the right and the seal 326 engages the tapered seat surface 342 to block flow through the passage 304. The fill valve member 322 will remain in this position until the pressure within the tank T drops below the opening force exerted by the spring 344 and pressure in the inlet portion 308.

From the above description of a preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. A constant flow regulator for controlling the flow of pressurized fluid from a tank, said regulator comprising:

a valve body for connection to a tank containing pressurized fluid, said valve body including a piston chamber, a pressure flow passageway extending from an inlet end to a first end of said piston chamber, and an outlet port communicating with said piston chamber;

a piston movable in said piston chamber;

a first spring at a second opposite end of said piston chamber urging said piston toward the first end of said piston chamber;

a handle for manually controlling the force of said first spring acting on said piston;

a check valve assembly in said pressure flow passageway including a seat having a fluid flow opening therein, a valve member, a valve guide for guiding said valve member, and a second spring for biasing said valve member and said valve guide towards said seat;

a check valve actuator between said piston and said valve member to transmit movement of said piston to said valve member to move said valve member between a closed position against said seat and an open position spaced from said seat, and a sleeve disposed in said pressure flow passageway around said check valve actuator, wherein said sleeve includes ribs along its length that are circumferentially spaced and define fluid flow passages with said check valve actuator.

2. The regulator of claim 1 wherein said control hangle is rotatable movable relative to said valve body and has an end portion that is linearly movable within chamber upon rotation of said control handle relative to said body.

3. The regulator of claim 1 wherein said valve member has an exterior surface in a spherical shape and said seat is annular.

4. The regulator of claim 3 wherein said valve member is the only valve disposed in said pressure flow passageway.

5. The regulator of claim 1 wherein said pressure flow passageway and said piston chamber are located coaxially relative to one another.

6. The regulator of claim 1 wherein said seat is comprised of an elastomeric material.

7. The regulator of claim 1 wherein a ratio of an area of said piston to an area of said fluid flow opening is selected such that a rate of fluid flow from the tank varies less than five percent over a pressure change in the tank of 2000 psi.

8. The regulator of claim 1 wherein said piston chamber and said piston are cylindrical with said piston having a smaller diameter than a diameter of said piston chamber, and said piston has an annular groove formed around its circumference and a sealing ring disposed in said groove that contacts said valve body.

9. The regulator of claim 1 further comprising a sleeve disposed in said passageway around said check valve actuator, wherein said sleeve includes ribs along its length that are circumferentially spaced and that define fluid flow passages with said check valve actuator.

10. The regulator of claim 1 further including a fill valve comprising:

a fill valve body member having a through passageway including a valve chamber open at one end, a restricted flow passage at the other end of said valve chamber, and an opening connected to said pressure flow passageway, said fill valve body member being connected to said valve body of said regulator so that said flow pressure passageway communicates with said open end of said valve chamber;

a valving member slidable in said valve chamber, said valving member having a nose that opens and closes said restricted flow passage, a head in said open end, and portions establishing fluid flow through said fill valve when said restricted flow passage is open, and a valving member spring acting on said valving member to urge it towards a position that opens said restricted flow passage, whereby fluid pressure in said open end of said chamber acting on said head will hold said valving member closed until the force of the fluid pressure is overcome by the force of said valving member spring, and whereby said valving member spring will hold said valving member open to permit the tank to be evacuated and charged with pressurized fluid.

11. The fill valve of claim 10 further including a stop to limit movement of said valving member in a direction away from said restricted flow passage.

12. The fill valve of claim 10 wherein said through passageway further includes a tapered seat portion adjacent said restricted flow passage.

13. The fill valve of claim 12 further including a seal received on said nose for engaging said tapered seat portion to inhibit fluid flow through said through passageway.

* * * * *